March 8, 1966     W. C. WORSTELL ET AL     3,239,043
MULTIPLE CLUTCH FOR POWER TAKE-OFF
Filed April 6, 1964

WAYNE C. WORSTELL
PERCY L. SYMONS
INVENTORS.

BY
BUCKHORN, BLORE, KLARQUIST & SPARKMAN
ATTORNEYS.

United States Patent Office 3,239,043
Patented Mar. 8, 1966

3,239,043
MULTIPLE CLUTCH FOR POWER TAKE-OFF
Wayne C. Worstell and Percy L. Symons, Portland, Oreg., assignors to Albina Engine and Machine Works, Inc., Portland, Oreg., a corporation of Oregon
Filed Apr. 6, 1964, Ser. No. 357,692
8 Claims. (Cl. 192—48)

This invention relates to power take-off units which, in general construction, are like that in the prior patents to L. R. Hussa, Nos. 2,496,538, 2,767,816 and 2,814,372.

In the prior Hussa power take-off units disclosed and claimed in the above patents, the engagement of a driven sheave with a center sheave was effected by imparting movement directly to the driven sheave which loads bearings in accordance with the magnitude of the contact pressure between the sheaves. In order to increase the output or capacity of such power take-off units, some users have increased the contact pressure an extent beyond that contemplated by the manufacturer to cause rapid wear of the bearings. It would be desirable to provide a power take-off unit in which excessive loads on the bearings thereof are prevented.

It is a main object of the present invention to provide a power take-off unit of the general type under consideration in which pressure is supplied in indirect fashion to the driven sheaves in a manner that prohibits the attainment of excessive contact pressure.

Another object of the invention is to provide in a power take-off unit means which not only effects engagement of the driven sheaves with the driving member, but also positively retracts the driven sheaves.

A further object of the invention is to provide a power take-off unit having a novel adjustment feature which facilitates the attainment of desired contact pressure in the initial setup of the unit, and thereafter enables maintaining such contact pressure reasonably constant despite wear of the engaging parts.

Various other objects of the invention will be apparent from the following description taken in connection with the accompanying drawings wherein.

Figure 2:
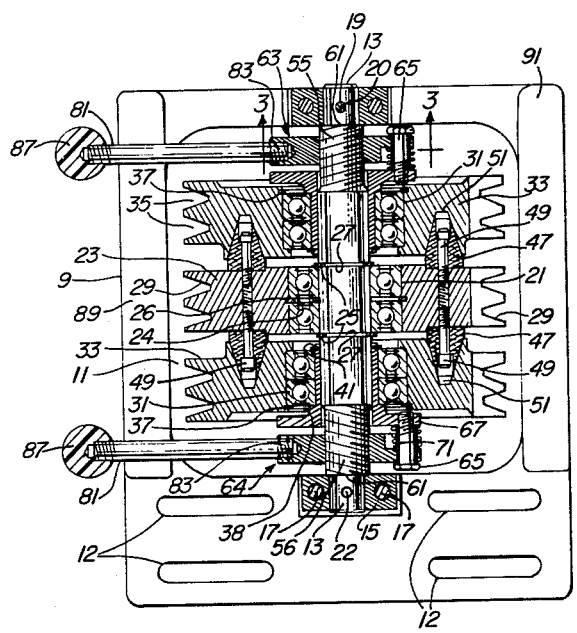
FIG. 2 is an enlarged, horizontal sectional view of the power take-off unit of FIG. 1, taken generally in the direction of the arrows 2—2 of FIG. 1.
Figure 3:
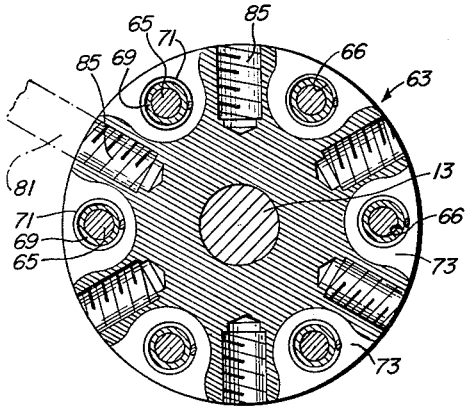
FIG. 3 is an enlarged, horizontal sectional view of a nut of the power take-off unit of FIG. 1, taken generally in the direction of the arrows 3—3 of FIG. 2 and turned slightly from the position thereof shown in FIGS. 1 and 2.

Referring to the drawings, the power take-off unit disclosed includes a frame 9 (FIG. 2) of generally rectangular configuration in plan and formed with a generally rectangular, sheave accommodating opening 11, and having slots 12 by which the frame may be mounted on a supporting structure, such as for instance, the frame of a power unit (not shown) from which power is to be derived. Supported by the frame 9 is a stationary shaft or countershaft 13 received at its ends by standards or pillow blocks 15 secured by cap screws or bolts 17 to the frame 9. A dog point cap screw 19 threads into the uppermost pillow block, as the parts are depicted in FIG. 2, and fits into and bottoms against the bottom of a mating hole 20 formed in the shaft 13 to prevent rotation of the shaft. The shaft 13 has a similar hole 22 at its opposite end so that the shaft is reversible end-for-end.

Mounted centrally on shaft 13 (FIG. 2) by radial-and-thrust ball bearings 21 is a friction center sheave 23 bored to receive the outer races of such bearings and adapted to be belt-driven from the power unit (not shown). The sheave 23 has a central groove 26 on the interior surface thereof receiving a split ring 24, and a pair of split rings 25 fit within grooves 27 formed in the shaft 13. These split rings 25 prevent endwise movement of the bearings 21 relative to the shaft, and the split ring 24 prevents endwise movement of the center sheave relative to the bearings. The center sheave has formed peripherally therearound one or more belt receiving grooves 29, two of such grooves being shown.

Disposed one on either side of the center sheave 23 (FIG. 2) and mounted indirectly on the shaft 13 for free rotation thereon by radial-and-thrust ball bearings 31 are a pair of power take-off or driven sheaves 33 counterbored to receive the outer races of the bearings. Each power take-off sheave has formed peripherally therearound one or more belt receiving grooves 35, each sheave being shown with two of such grooves. Belts (not shown) are adapted to transmit power from the power take-off sheaves to auxiliary devices adjacent the power take-off unit. The bearings 31 are retained in place by snap rings 37 and are mounted on a sleeve 38, which, in turn, is slidably mounted on the fixed shaft 13. The outermost inner race of each bearing 31 abuts against a shoulder provided on the sleeve 38 and is retained against such shoulder by a snap ring 41. The further construction of each of the sleeves 38 will be mentioned hereinafter.

Arranged between the power take-off sheaves 33 (FIG. 2) and the center sheave 23 are annular, friction drive elements or rings 47, which are secured by cap screws or bolts 49 to the center sheave 23. Each power take-off sheave is provided on its inner face with an annular groove 51 which is complementary in formation to the configuration of the opposed friction drive element, which is of generally tapered configuration, thus providing mating friction surfaces between each power take-off sheave and the center sheave adapting them to be brought into engagement to effect a driving relationship between the center sheave and the desired power take-off or driven sheave 33.

Figure 4:
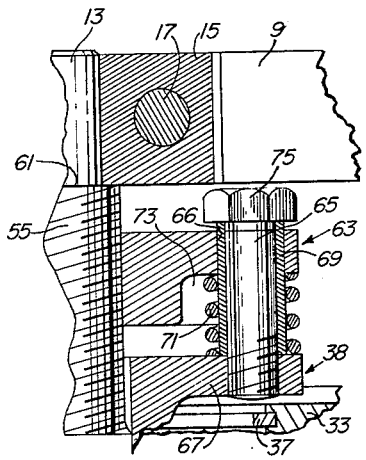
FIG. 4 is an enlarged view of a portion of FIG. 2.

The fixed shaft 13 (FIG. 2) has a pair of spaced, threaded portions, or screw portions 55 and 56, which are of right and left-hand configuration, respectively. These threaded portions terminate in shoulders 61 which abut against the pillow blocks 15. The threads on these threaded portions preferably are of the acme form, although they could be of other form which provides for ready threading movement of a nut thereon, and which can effect the transmission of power without undue wear. Mounted on the threaded portions are actuating nuts 63 and 64. Each nut 63 and 64 is operatively connected to its associated sleeve 38 by means of a series of drive pins or bolts 65 (FIG. 4) which pass through holes 66 in the actuating nuts 63 and 64 and thread into tapped holes provided in flanges 67 provided on the outer ends of the sleeves 38. A spacer bushing 69 surrounds each of the bolts 65 and determines the maximum spacing between each actuating nut and its sleeve 38. Surrounding each of the bushings is a strong compression spring 71 which is arranged in a compressed condition between each nut and its sleeve. As shown in FIG. 4, opposite ends of each spring abut against the sleeve and nut and the nut is provided with a plurality of recesses 73 to accommodate the springs. Heads 75 of the bolts are disposed next to the outer face of the associated nuts 63 and 64, and limit separation of the nuts and sleeves. An operating handle 81 (FIG. 2) provided for each nut 63 and 64 has a threaded inner end 83 which is threadedly received in any of a plurality of circumferentially located, radially extending threaded holes 85 formed in the peripheral surface of such nut. Each handle has a suitable knob 87 at its outer end to enable it to be manually grasped. It should be here pointed out that the handle 81 is only one form of operating means for the nuts and the nuts could be otherwise operated, such as for instance, by having sprocket teeth formed on the peripheries thereof and rotated by means of a chain.

Figure 1:
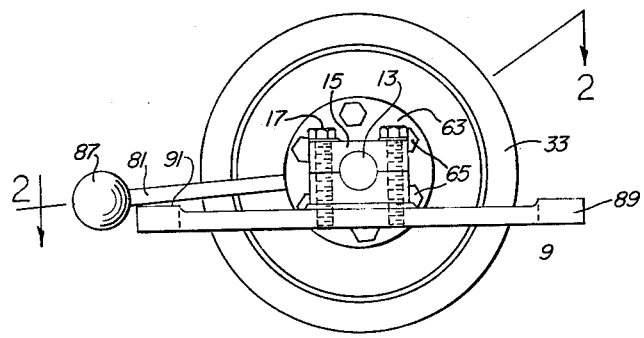
FIG. 1 is a side elevation view of a power take-off unit embodying the concepts of the present invention.

In the position shown in FIGS. 1 and 2, the handles 81 are disposed in their active, operating positions, but each can be swung 180° from its active position in contact with a pad 91 formed on the frame 9 to contact with a pad 89, also formed on the frame 9. When so swung, the actuating nuts 63 and 64 are turned on the shaft to advance axially outwardly and positively retract the sleeves 37 after the lost motion between the nut and the sleeve is taken up. It is pointed out that the bolts 65 do provide a lost motion connection between each of the nuts 63 and 64 and its sleeve 38 permitting each nut to advance axially toward its sleeve to compress the springs 71, but limit separating movement of the nut and sleeve. The contact pressure between a power take-off sheave and the center sheave is positively regulated because each nut 63 and 64 can be rotated only 180° and this can axially advance the nut only a predetermined amount. Upon engagement of one of the power take-off sheaves 33 and the center sheave 23, further axial advancement of the nut associated therewith only compresses the springs 71 which increases the contact pressure only slightly. That is, the sleeves 38 are never rigidly or positively forced toward the center sheave but are always only urged theretoward by the springs, which, of course, are sufficiently strong to provide the necessary thrust.

Having described the invention in what is considered to be the preferred embodiment thereof, it is desired that it be understood that the invention is not to be limited other than by the provisions of the following claims.

We claim:
1. A power take-off unit comprising,
a frame for mounting next to a rotating power shaft,
a countershaft fixed to said frame,
a center driving sheave rotatably mounted on said countershaft in an axially stationary position and adapted to be constantly driven via a connection to the power shaft,
a pair of driven sheaves disposed one on either side of said center sheave in surrounding relation to said countershaft and adapted, when driven, to transmit power to auxiliary devices,
a pair of sleeves one for each sheave,
each sheave being rotatably mounted on its sleeve in an axially stationary position with respect thereto,
each sleeve slidably mounted on said countershaft for axial movement from an outer inoperative position where the associated sheave is spaced from said center sheave to an inner operative position where the associated sheave is in driven engagement with said center sheave,
said countershaft having a pair of spaced threaded portions located adjacent the respective outer faces of said driven sheaves,
a pair of actuating nuts threaded on the threaded portions of said countershaft,
a series of axially extending bolts slidably extending through each nut and threaded into the associated sleeve,
compressive spring means between each nut and its sleeve,
a handle detachably connected in radial fashion to each nut to facilitate turning movement of each nut relative to said countershaft whereby to effect axial movement of each nut toward or away from the associated sleeve to effect engagement or disengagement of the associated sheave,
each nut having a series of circumferentially spaced handle connecting places to enable selective engagement of the handle and the last mentioned nut to facilitate initial adjustment of the pressure of engagement of the associated driven sheave with said center sheave and to enable relocation of said handle to facilitate axial adjustment of said nut to compensate for wear of the engaging surfaces of said sheaves,
the bolts of each nut having the heads thereof located next to the outer face of such nut so as to abut thereagainst upon retraction of such nut to effect retraction of the associated sleeve and sheave.

2. A power take-off unit comprising,
a frame for mounting next to a rotating power shaft,
a countershaft fixed to said frame,
a center driving sheave rotatably mounted on said countershaft in an axially stationary position and adapted to be constantly driven via a connection to the power shaft,
a pair of driven sheaves disposed one on either side of said center sheave in surrounding relation to said countershaft and adapted, when driven, to transmit power to auxiliary devices,
a sleeve for each sheave,
each sheave being rotatably mounted on its sleeve in an axially stationary position with respect thereto,
each sleeve being slidably mounted on said countershaft for axial movement from an outer inoperative position where the associated sheave is spaced from said center sheave to an inner operative position where the associated sheave is in driven engagement with said center sheave,
said countershaft having a pair of spaced threaded portions located adjacent the respective outer faces of said driven sheaves,
an actuating nut threaded on each threaded portion,
means providing an operative connection between each nut and the associated sleeve to permit each nut to approach its sleeve and to effect retraction of each sleeve upon retraction of the associated nut,
spring means between each nut and its sleeve to effect an increasing pressure on such sleeve as such nut approaches such sleeve,
a handle detachably connected in radial fashion to each nut to facilitate turning movement of each nut relative to said countershaft whereby to effect axial movement of each nut toward or away from the associated sleeve to effect engagement or disengagement of the associated sheave,
each nut having a series of circumferentially spaced handle connecting places to enable selective engagement of handle and nut to facilitate initial adjustment of the pressure of engagement of the associated driven sheave with said center sheave and to enable relocation of said handle to facilitate axial adjustment of said nut to compensate for wear of the engaging surfaces of said sheaves.

3. A power take-off unit comprising,
a frame for mounting next to a rotating power shaft,
a countershaft fixed to said frame,
a center driving sheave rotatably mounted on said countershaft in an axially stationary position and adapted to be constantly driven via a connection to the power shaft,
a pair of driven sheaves disposed one on either side of said center sheave in surrounding relation to said countershaft and adapted, when driven, to transmit power to auxiliary devices,
a sleeve for each sheave,
each sheave being rotatably mounted on its sleeve in an axially stationary position with respect thereto,
each sleeve being slidably mounted on said countershaft for axial movement from an outer inoperative position where the associated sheave is spaced from said center sheave to an inner operative position where the associated sheave is in driven engagement with said center sheave, said countershaft having a pair of spaced threaded portions located adjacent the respective outer faces of said driven sheaves,
an actuating nut threaded on each threaded portion,
means providing an operative connection between each nut and the associated sleeve to permit each nut to approach its sleeve and to effect retraction of each sleeve upon retraction of the associated nut,
spring means between each nut and its sleeve to effect an increasing pressure on such sleeve as such nut approaches such sleeve,
means for rotating each nut to facilitate turning movement of each nut relative to said countershaft whereby to effect axial movement of each nut toward or away from the associated sleeve to effect engagement or disengagement of the associated sheave.

4. A power take-off unit comprising,
a frame for mounting next to a rotating power shaft,
a countershaft fixed to said frame,
a driving sheave rotatably mounted on said countershaft in an axially stationary position and adapted to be constantly driven via a connection to the power shaft,
a driven sheave disposed next to said driving sheave in surrounding relation to said countershaft and adapted, when driven, to transmit power to auxiliary devices,
a sleeve for said driven sheave,
said driven sheave being rotatably mounted on said sleeve in an axially stationary position with respect thereto,
said sleeve being slidably mounted on said countershaft for axial movement from an outer inoperative position where said driven sheave is spaced from said driving sheave to an inner operative position where said driven sheave is in driven engagement with said driving sheave,
said fixed shaft having a screw portion,
an actuating nut threadedly received on said screw portion,
spring means urging said nut and driven sheave apart,
means for turning said nut in either of two directions to axially advance or axially retract said driven sheave,
and means operatively connecting said nut and sleeve prohibiting relative circumferential movement therebetween but permitting relative axial movement therebetween.

5. A power take-off unit comprising,
a frame for mounting next to a rotating power shaft,
a countershaft fixed to said frame,
a driving sheave rotatably mounted on said countershaft in an axially stationary position and adapted to be constantly driven via a connection to the power shaft,
a driven sheave disposed next to said driving sheave in surrounding relation to said countershaft and adapted, when driven, to transmit power to auxiliary devices,
a sleeve for said driven sheave,
said driven sheave being rotatably mounted on said sleeve in an axially stationary position with respect thereto,
said sleeve being slidably mounted on said countershaft for axial movement from an outer inoperative position where said driven sheave is spaced from said driving sheave to an inner operative position where said driven sheave is in driven engagement with said driving sheave,
said fixed shaft having a screw portion,
an actuating nut threadedly received on said screw portion,
means operatively connecting said nut and sleeve prohibiting relative circumferential movement therebetween, but permitting limited axial movement therebetween,
spring means urging said nut and driven sheave apart,
and means for rotating said nut in either of two directions to axially advance or retract said driven sheave,
the last named means comprising a handle detachably secured in radial relation to said nut,
and means whereby said handle may be secured in any of a number of radial positions on said nut.

6. A power take-off unit comprising,
a frame for mounting next to a rotating power shaft,
a countershaft fixed to said frame,
a center driving sheave rotatably mounted on said countershaft in an axially stationary position and adapted to be constantly driven via a connection to the power shaft,
a pair of driven sheaves disposed one on either side of said center sheave in sourrounding relation to said countershaft and adapted, when driven, to transmit power to auxiliary devices,
a pair of sleeves one for each sheave,
each sheave being rotatably mounted on its sheave in an axially stationary position with respect thereto,
each sheave being rotatably mounted on its sleeve in shaft for axial movement from an outer inoperative position where the associated sheave is spaced from said center sheave to an inner operative position where the associated sheave is in driven engagement with said center sheave,
said countershaft having a pair of spaced threaded portions located adjacent the respective outer faces of said driven sheaves,
a pair of actuating nuts threaded on the threaded portions of said countershaft,
a series of axially extending bolts slidably extending through each nut and threaded into the associated sleeve,
compressive spring means between each nut and its sleeve,
a handle detachably connected in radial fashion to each nut to facilitate turning movement of each nut relative to said countershaft whereby to effect axial movement of each nut toward or away from the associated sleeve to effect engagement or disengagement of the associated sheave,
each nut having a series of circumferentially spaced handle connecting places to enable selective engagement of the handle and the last mentioned nut to facilitate initial adjustment of the pressure of engagement of the associated driven sheave with said center sheave and to enable relocation of said handle to facilitate axial adjustment of said nut to compensate for wear of the engaging surfaces of said sheaves,
the bolts of each nut having the heads thereof located next to the outer face of such nut so as to abut thereagainst upon retraction of such nut to effect retraction of the associated sleeve and sheave,
one of the threaded portions being right handed and one being left so that rotation of said nuts in the same direction produces a similar result.

7. A power take-off unit comprising,
a frame for mounting next to a rotating power shaft,
a countershaft fixed to said frame,
a driving sheave rotatably mounted on said countershaft in an axially stationary position and adapted to be constantly driven via a connection to the power shaft,
a driven sheave disposed next to said driving sheave in surrounding relation to said countershaft and adapted, when driven, to transmit power to auxiliary devices,
a sleeve for said driven sheave,
said driven sheave being rotatably mounted on said sleeve in an axially stationary position with respect thereto,
said sleeve being slidably mounted on said countershaft for axial movement from an outer inoperative position where said driven sheave is spaced from said driving sheave to an inner operative position where said driven sheave is in driven engagement with said driving sheave, an actuating member mounted on said fixed shaft for axial movement from an outer inoperative position inwardly toward said driven sheave and from an inner operative position away from said driven shaft, means for effecting such movement of said actuating member, a series of axially extending bolts slidably extending through said actuating member and threaded into said sleeve, compressive spring means between said actuating member and sleeve urging them apart, said bolts preventing separation of said actuating member and sleeve beyond a predetermined extent and thus limiting the separation of said actuating member and sleeve under the influence of said compressive spring means and hence preventing establishment of a driving relationship between said driven and driving sheaves when said actuating member is in its outer inoperative position, said compressive spring means having sufficient compressibility so that they do not bottom out when said actuating member is moved to its operative position whereby the driving engagement between said sheaves is determined by the extent of compression of said springs rather than the force available to actuate said actuating member.

8. A power take-off unit comprising, a frame for mounting next to a rotating power shaft, a countershaft fixed to said frame, a driving sheave rotatably mounted on said countershaft in an axially stationary position and adapted to be constantly driven via a connection to the power shaft, a driven sheave disposed next to said driving sheave in surrounding relation to said countershaft and adapted, when driven, to transmit power to auxiliary devices, a sleeve for said driven sheave, said driven sheave being rotatably mounted on said sleeve in an axially stationary position with respect thereto, said sleeve being slidably mounted on said countershaft for axial movement from an outer inoperative position where said driven sheave is spaced from said driving sheave to an inner operative position where said driven sheave is in driven engagement with said driving sheave, an actuating member mounted on said countershaft, and means operative upon rotation of said actuating member for causing axial movement thereof from an outer inoperative position inwardly toward said driven sheave and from an inner operative position outwardly away from said driven sheave, means for effecting such rotary movement of said actuating member, a series of axially extending bolts slidably extending through said actuating member and threaded into said sleeve, compressive spring means between said actuating member and sleeve urging them apart, said bolts preventing separation of said actuating member and sleeve beyond a predetermined extent and thus limiting the separation of said actuating member and sleeve under the influence of said compressive spring means and hence preventing establishment of a driving relationship between said driven and driving sheaves when said actuating member is in its outer inoperative position, said compressive spring means having sufficient compressibility so that they do not bottom out when said actuating member is moved to its operative position whereby the driving engagement between said sheaves is determined by the extent of compression of said springs rather than the force available to actuate said actuating member.

References Cited by the Examiner

UNITED STATES PATENTS

| | | | |
|---|---|---|---|
| 1,147,104 | 7/1915 | Lawton | 192—94 |
| 1,885,827 | 11/1932 | Hottman | 192—94 |
| 2,465,054 | 3/1949 | Berg | 192—94 |
| 2,814,372 | 11/1957 | Hussa | 192—48 |

DAVID J. WILLIAMOWSKY, *Primary Examiner.*